Feb. 24, 1931.　　MOHAMED ABD EL LATIF MOHARRAM　1,794,313

WATER POWER PLANT

Filed Aug. 21, 1929

INVENTOR
MOHAMED ABD EL.
LATIF MOHARRAM
by his attorneys
Howson and Howson

Patented Feb. 24, 1931

1,794,313

UNITED STATES PATENT OFFICE

MOHAMED ABD EL LATIF MOHARRAM, OF PARIS, FRANCE

WATER-POWER PLANT

Application filed August 21, 1929, Serial No. 387,433, and in Germany August 29, 1928.

Heretofore power plants, adapted to utilize water power of varying heads, have been provided with a connecting canal on the head water side extending over the entire length of the power house and situated vertically to the flow of the water. The canal has had locking devices to and between each of the water chambers so that every water turbine could be connected with any one of the remaining turbines whereby the intermediate turbines had to fall off. This arrangement however has the further disadvantage that in case one of the turbines has to be repaired the preceding turbine has also to be stopped in order to dry the chamber of the damaged turbine. This arrangement is necessary, if importance is attached to the fact, that as many of the remaining turbines as possible be connected in series.

The necessity to arrest another turbine besides the turbine stopped on account of not being in working condition is eliminated if the connecting canal is placed on the tail water side of the power house and is shut off towards the tail water by a fixed locking device.

In the accompanying drawings—

Figures 1 and 2 illustrate a typical embodiment of the invention in which

Figure 1 is a longitudinal section of a water turbine layout and

Figure 2 is a plan view of the same.

$h_1$, $h_2$ represent the turbines; $n_1$, $n_2$ the inlet sluices; $i_1$, $i_2$ the suction pipes; $k_1$, $k_2$ the water or turbine chambers; $l_1$, $l_2$ the pivoted valves of the suction pipes.

The turbine chambers can be shut off on the tail water side by locking devices or gates $q_1$, $q_2$. By this arrangement at the lower end of the chambers $k_1$, $k_2$ chambers $r_1$, $r_2$ are formed, which may be separated one from the other by other locking devices or gates $s_1$, $s_2$ the totality of these chambers representing the connecting canal, the canal being separated from the tail water by the wall or fixed barrier $t$.

Figure 1:
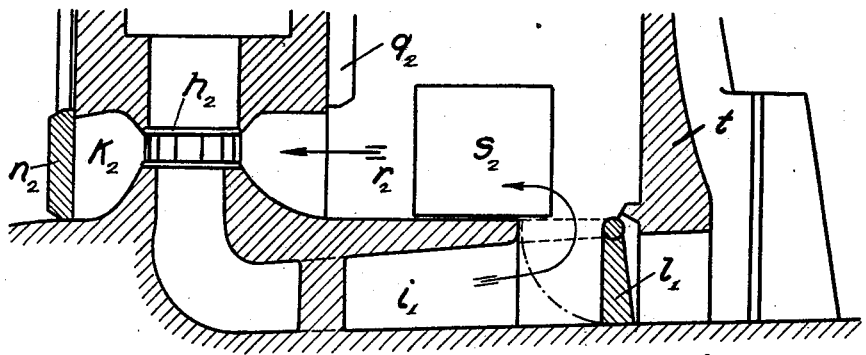

In such cases where the water turbines are put in parallel the inlet sluices $n_1$, $n_2$ are opened, the locking devices $q_1$, $q_2$ closed, the sliding valves $l_1$, $l_2$ in the position as shown in dotted lines in Figure 1, opening the outlets of suction pipes into the tail water. The locking devices $s_1$, $s_2$ are closed. The water is flowing in the direction T into all water turbine chambers, passes through the turbines and from there it flows to the tail water.

Figure 2:
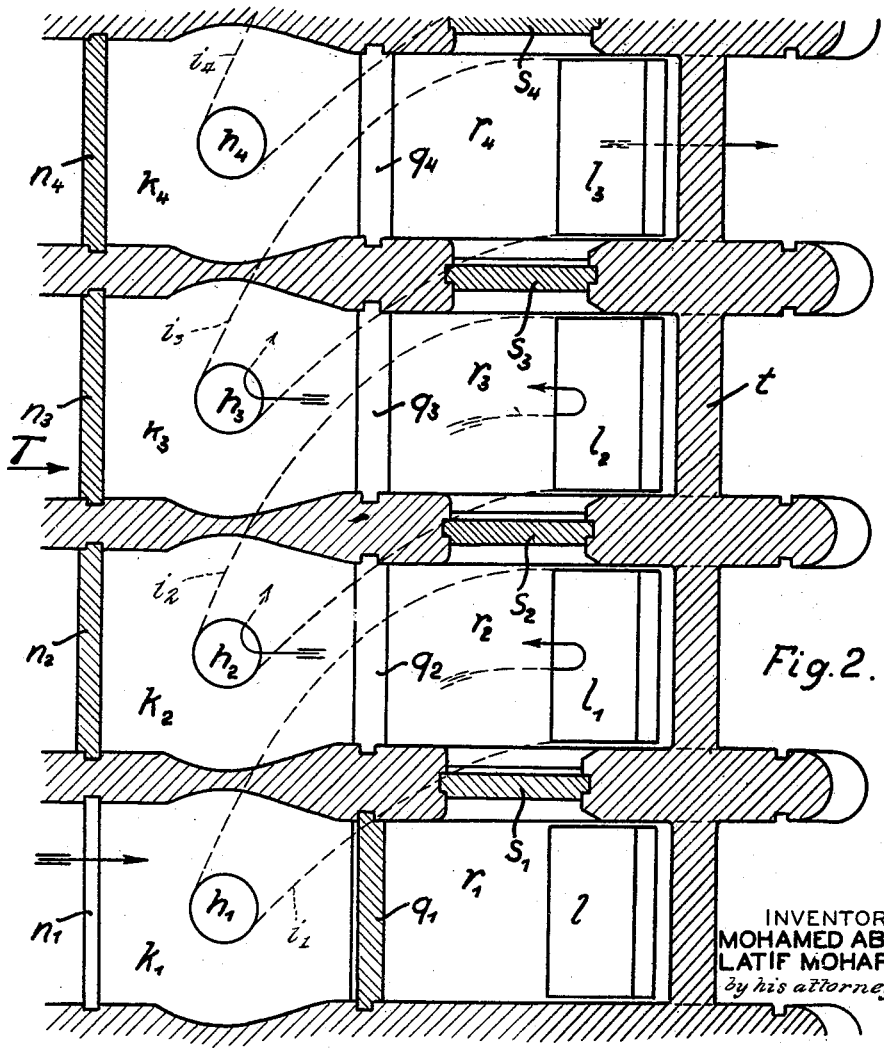

In Figures 1 and 2 an arrangement is shown where the water turbines are coupled in series. The inlet sluice $n_1$ is open, $n_2$, $n_3$, $n_4$ are closed. The locking device $q_1$ is closed, $q_2$, $q_3$, $q_4$ are open, the locking devices $s_1$, $s_2$, $s_3$ and $s_4$ are all closed. The pivoted valves of the suction pipes $l_1$, $l_2$, $l_3$ are placed vertically and shut off the outlets of the suction pipes towards the tail water. $l_3$ is placed horizontally. The water flows into the chamber $k_1$, passes turbine $h_1$, the suction pipe $i_1$ from there it flows into the chamber $r_2$, $k_2$ passes $h_2$, $i_2$, $r_3$, $k_3$, $h_3$, $i_3$, $r_4$, $k_4$, $h_4$, $i_4$ and flows into the tail water.

Should for instance turbine $h_3$ have to be stopped the locking device $q_3$ is closed, $s_3$ is opened, $l_3$ turned into a vertical position. The water discharged from $i_2$ flows from chamber $r_3$ to chamber $r_4$ and from there to $k_4$. A further water turbine is added so that again four water turbines are coupled in series. The turbine chamber $h_3$ is locked in order that the turbine may be inspected for repairs.

I claim:

A water power plant comprising water turbines, turbine chambers, a connecting canal extending over the entire length of the power house and situated substantially vertically to the flow of water, locking devices between said connecting canal and each of said turbine chambers, locking devices in the canal between either of the turbine chambers, said connecting canal being placed on the tail water side of the power house and being separated from the tail water by a fixed barrier.

In testimony of which I have affixed my signature to this specification.

MOHAMED ABD EL LATIF MOHARRAM.